E. S. LENOX.
WIRE BALE FASTENING.
No. 7,027. Reissued April 4, 1876.
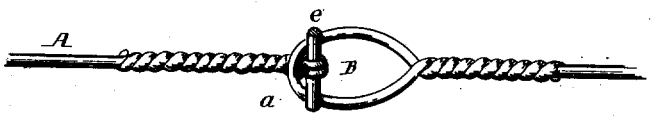
Witnesses:
Otis F. Pressley
Courtney A. Cooper.
Edwin S. Lenox
By his atty
Charles E. Foster
N. PETERS, PHOTO-LITHOGRAPHER, WASHINGTON, D. C.

UNITED STATES PATENT OFFICE.

EDWIN S. LENOX, OF NEW YORK, N. Y.

IMPROVEMENT IN WIRE BALE-FASTENINGS.

Specification forming part of Letters Patent No. 98,169, dated December 21, 1869; reissue No. 7,027, dated April 4, 1876; application filed March 10, 1876.

DIVISION B.

*To all whom it may concern:*

Be it known that I, EDWIN S. LENOX, of the city, county, and State of New York, formerly of New Brighton, in said State, have invented certain new and useful Improvements in Wire Bale-Ties, of which the following is a complete description, reference being had to the drawings, in which—

Figure 1 shows the invention complete.

In the drawing, A represents the bale-band wire. B represents the loop formed in one end of the wire, and *e e* is a cross-head or piece of rigid metal intended to be passed through the loop and secured there. The loop B is made broad enough at the middle or near the wire for the cross-head to pass through without being bent or turned around; but the other end *a* of the loop is so narrow that the cross-head cannot be drawn through when by the strain of the bale it is drawn toward it from the broad part. The cross-head is secured to the wire by the latter coiling around it and then twisting back upon itself.

The broad part of the loop should be at least a little broader than one arm of the cross-head *e e*, so that the latter can be inserted without materially twisting it around from its normal position; but it need not be as broad as the length of the cross-head.

The manner of constructing and operating the device will be fully understood by referring to the drawing, and does not need further explanation.

What I claim as my invention, and desire to secure by Letters Patent, is—

A wire bale-tie, consisting of the elliptical wire loop at one end, and at the other end having an eye, with a permanently attached cross-piece of rigid metal passing through said eye, substantially as shown and described.

EDWIN S. LENOX.

Witnesses:
W. B. GLASSFORD,
SAMUEL WHELAN.